United States Patent
Wesstrom et al.

(10) Patent No.: US 9,921,370 B2
(45) Date of Patent: Mar. 20, 2018

(54) WAVEGUIDE FOR EXTRACTION OF LIGHT AT LOW LEVELS OF REFLECTION

(75) Inventors: Jan-Olof Wesstrom, Stockholm (SE); Per Granestrand, Tyreso (SE); Stefan Hammerfeldt, Ekero (SE)

(73) Assignee: SYNTUNE AB, Kista (SE)

( * ) Notice: Subject to any disclaimer, the term of this patent is extended or adjusted under 35 U.S.C. 154(b) by 327 days.

(21) Appl. No.: 13/120,013

(22) PCT Filed: Sep. 17, 2009

(86) PCT No.: PCT/SE2009/051037
§ 371 (c)(1),
(2), (4) Date: Jun. 1, 2011

(87) PCT Pub. No.: WO2010/036186
PCT Pub. Date: Apr. 1, 2010

(65) Prior Publication Data
US 2011/0222816 A1    Sep. 15, 2011

(30) Foreign Application Priority Data
Sep. 23, 2008    (SE) .................................... 0850021

(51) Int. Cl.
G02B 6/26    (2006.01)
G02B 6/122    (2006.01)
G02B 6/42    (2006.01)

(52) U.S. Cl.
CPC .......... G02B 6/1228 (2013.01); G02B 6/4207 (2013.01)

(58) Field of Classification Search
None
See application file for complete search history.

(56) References Cited

U.S. PATENT DOCUMENTS

| | | | | |
|---|---|---|---|---|
| 5,393,371 A | * | 2/1995 | Chang et al. | 216/24 |
| 5,539,571 A | | 7/1996 | Welch et al. | |
| 5,710,847 A | | 1/1998 | Takano et al. | |
| 6,108,472 A | * | 8/2000 | Rickman et al. | 385/48 |
| 6,289,147 B1 | * | 9/2001 | Bulthuis et al. | 385/24 |

(Continued)

FOREIGN PATENT DOCUMENTS

| | | |
|---|---|---|
| JO | 5142435 B2 | 2/2013 |
| JP | H11-046044 A | 2/1999 |

(Continued)

OTHER PUBLICATIONS

International Search Report, dated Jan. 8, 2010, from corresponding PCT application.

(Continued)

*Primary Examiner* — Chris Chu
(74) *Attorney, Agent, or Firm* — Young & Thompson

(57) ABSTRACT

A waveguide for the extraction of light at low levels of reflection arranged to guide light from an electro-optical component on a chip to a facet on the chip for extraction includes a first part and a second part. The first part (4) is extended, the second part (5) includes a surface (JK) through which the light exits from the waveguide (1). A non-adiabatic longitudinal section (GHLM) is located after the first part (4) but before the surface (JK) in the direction of propagation of the light, and the surface (JK) forms in the plane of the chip a first angle (V1) with the optical axis (A) of the first part (4) that lies between 5 and 80 degrees.

22 Claims, 2 Drawing Sheets

(56) References Cited

U.S. PATENT DOCUMENTS

| | | | |
|---|---|---|---|
| 6,374,013 B1* | 4/2002 | Whiteaway et al. | 385/37 |
| 6,643,432 B2 | 11/2003 | Bouda | |
| 6,892,008 B2* | 5/2005 | Singh et al. | 385/49 |
| 7,343,070 B2* | 3/2008 | Van Der Vliet et al. | 385/43 |
| 7,817,882 B2* | 10/2010 | Blauvlet et al. | 385/14 |
| 2002/0057873 A1* | 5/2002 | Wu | G02B 6/262 385/33 |
| 2002/0061153 A1 | 5/2002 | Sillard et al. | |
| 2002/0076133 A1* | 6/2002 | Li et al. | 385/16 |
| 2002/0104822 A1* | 8/2002 | Naydenkov et al. | 216/24 |
| 2003/0165296 A1* | 9/2003 | Bouda | G02B 6/1228 385/43 |
| 2004/0179785 A1* | 9/2004 | Komiya et al. | 385/49 |
| 2006/0140540 A1* | 6/2006 | Yamamoto et al. | 385/45 |
| 2006/0204175 A1* | 9/2006 | Laurent-Lund et al. | 385/43 |
| 2010/0119195 A1* | 5/2010 | Doerr | 385/46 |

FOREIGN PATENT DOCUMENTS

| | | |
|---|---|---|
| JP | 2000-098161 A | 4/2000 |
| JP | 5175611 B2 | 4/2013 |
| WO | 2007036704 A1 | 4/2007 |

OTHER PUBLICATIONS

Oct. 24, 2017, EP communication issued for related EP application No. 09816522.8.

* cited by examiner

WAVEGUIDE FOR EXTRACTION OF LIGHT AT LOW LEVELS OF REFLECTION

BACKGROUND OF THE INVENTION

Field of the Invention

The present invention relates to a waveguide for the extraction of light at low levels of reflection.

Description of the Related Art

For certain electro-optical components with waveguides, such as lasers, amplifiers and modulators, it is necessary to achieve very low levels of reflection at the point or points at which the light is extracted from the waveguide after a light-generating crystal. The reflection, seen from inside of the crystal, is typically approximately 30% for a waveguide of, for example, indium phosphide that is abruptly interrupted. Levels of reflection that lie below 0.001% are required for certain applications.

The coating of the sectioned exit surface with dielectrics whose thickness and refractive index are adapted to give low levels of reflection is known. Additional measures, however, are required. If the angle between the waveguide and the section plane is not 90 degrees, only a small part of the light is reflected back into the waveguide. The remainder is reflected into different directions and is lost.

It is, of course, possible for the waveguide to be perpendicular to the facet of the component over a part of the length of the component and then to be bent such that the angle it makes with the facet is no longer a right angle. This is possible in, for example, an SOA (semiconductor optical amplifier).

Another method is the use of a window construction, which involves the waveguide being terminated within the component, the chip, before the waveguide reaches the facet. In this way, the light is spread by diffraction before it reaches the facet. Due to the spreading of the light beam, only a small part of the light reaches back into the waveguide after reflection in the facet. The region of the window, i.e. the region between the end of the waveguide and the facet of the component, may have a length of, for example, 5-50 micrometers, for InP components. The light spreads in this manner in a lobe with an angle of a few degrees.

Even lower levels of reflection can be obtained by combining oblique placement of the waveguide, such that it is not orthogonal with the facet, and a window region. If the obliqueness of the waveguide is greater than the width of the diffracted lobe, the fraction of light that reaches back to the waveguide will be very small.

Placement of the waveguide at a very high obliqueness causes problems, since the chip in this case will be wider. Other problems of a process technical nature may also arise such that anisotropic etching, for example, may give a disadvantageous form of mesas in the direction of obliqueness.

SUMMARY OF THE INVENTION

The present invention solves the problem of achieving very low levels of reflection.

The present invention thus relates to waveguide for the extraction of light at low levels of reflection arranged to guide light from an electro-optical component on a chip to a facet of the chip for extraction, and is characterised in that the waveguide comprises a first part and a second part, in that the first part is extended, in that the second part comprises a surface through which the light exits from the waveguide, in that a non-adiabatic longitudinal section is located after the first part but before the said surface in the direction of propagation of the light, and in that the said surface forms in the plane of the chip a first angle with the optical axis of the first part that lies between 5 and 80 degrees.

BRIEF DESCRIPTION OF THE DRAWING FIGURES

The invention is described in more detail below, partly in association with an embodiment shown in the attached drawings, where:

DETAILED DESCRIPTION OF THE INVENTION

Figure 1:
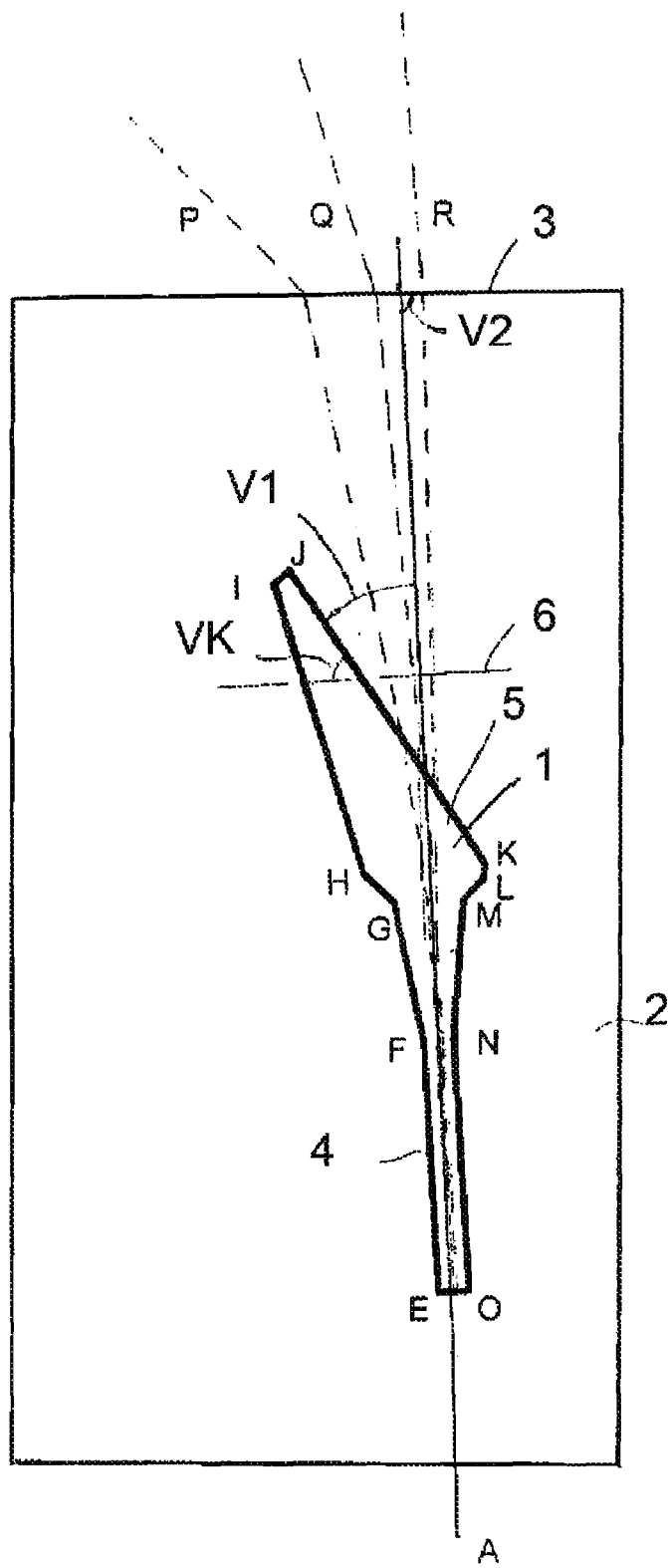
FIG. 1 shows a component according to the invention.

A waveguide 1 according to the invention for the extraction of light at low levels of reflection is shown in FIG. 1. The waveguide 1 is arranged to guide light from an electro-optical component, such as a laser, on a chip 2 to a facet 3 on the chip, for its extraction to, for example, a further waveguide.

The waveguide comprises according to the invention a first part 4 and a second part 5. The first part 4 is extended. The letter A in FIG. 1 denotes the optical axis of the first part 4. The second part 5 comprises a surface JK, through which the light exits from the waveguide 1. This surface JK forms in the plane of the chip a first angle V1 with the optical axis A of the first part 4, which angle lies between 5 and 80 degrees.

A non-adiabatic longitudinal section (GHLM) is present between the first part 4 and the second part 5. Large levels of reflection are experienced where the waveguide ends, if this section (GHLM) is not present. The purpose of this section is that the light is to exit from the side surfaces GH and LM, or rather that the side surfaces are to deliver the light, which continues straight on. If the broadening is not sudden and not adiabatic, the light will impinge upon the corners K or L and I or J, whereby reflection might take place, which reflects a part of the light back into the waveguide. There is also a risk that reflection may take place at the corners H and K, L between the side surfaces.

The surface denoted JK in FIG. 1 thus constitutes an obliquely cut section of the waveguide. The angle Vk in FIG. 1 is the angle between the surface JK and a line 6 that is orthogonal to the line A, i.e. orthogonal to the optical axis of the first part. The angle Vk is denoted below as the "sectioning angle".

According to a preferred embodiment, the said surface (JK) forms a first angle (V1) with the optical axis of the first part 4 that lies below 70 degrees and lies above 20 degrees.

According to a preferred embodiment, the said first part 4 forms in the plane of the chip a second angle V2 that is not a right angle with the said facet 3. The reason for this is that the refraction from the surface JK is limited in angle, and this is why it is advantageous that the light already has a direction in the first part that is not orthogonal to the facet 3.

According to one preferred embodiment, the said second angle (V2) lies under 89 degrees, but lies above 85 degrees.

According to the invention, the problems that are associated with placing the complete waveguide obliquely are avoided, through refraction in the oblique surface leading to light reaching the facet in a manner that is not orthogonal.

A refractive effect is obtained through the low-angle oblique cutting of JK, which refractive effect ensures that the light exits from the waveguide 1 at an angle that is sufficiently large to obtain a sufficiently low level of reflection back into the waveguide when the light exits from the waveguide.

Figure 2:
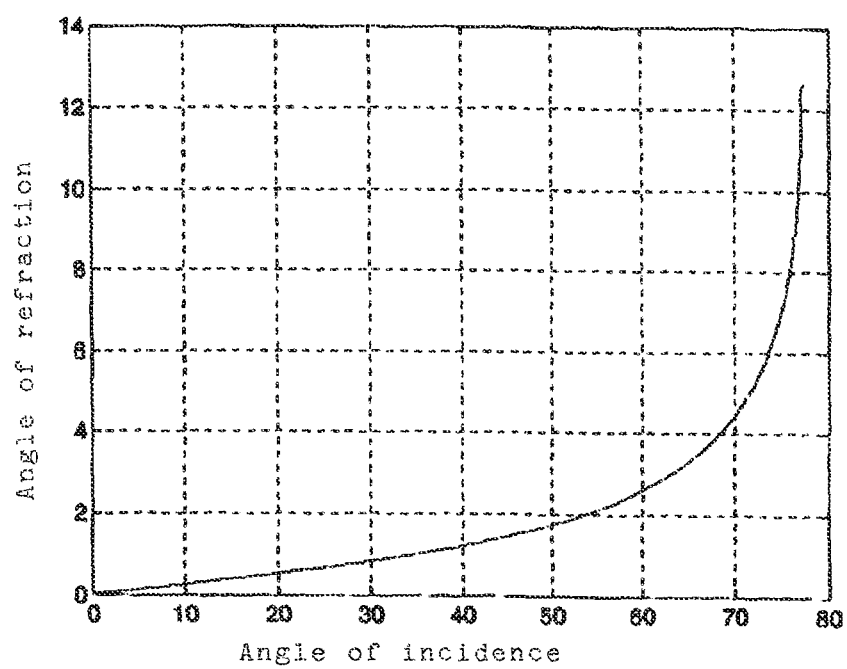
FIG. 2 is a diagram showing an angle of refraction as a function of the angle of incidence onto a surface JK.

The angle for the light beam that exits from the waveguide is shown in FIG. 2, in which the angle of refraction is plotted as a function of the angle of incidence onto the surface JK. FIG. 2 makes it clear, for example, that an angle of incidence of 60 degrees is required in order to obtain a refraction of just over 2 degrees.

However, sectioning angles Vk that are too large lead to the reflection at the surface JK becoming too large. Even though the risk is small that this light will come back to the waveguided mode in the narrow part 4 of the waveguide, this light is lost since it will be transported away at an undesired angle.

According to one preferred embodiment, the said first angle V1 lies in the interval 50 to 60 degrees, when expressed as a sectioning angle: Vk=90 degrees-V1.

According to one preferred embodiment, the said second angle V2 lies in the interval 86 to 88 degrees.

According to a further preferred embodiment, the said second part 5 comprises a section FGMN in FIG. 1, along which the waveguide 1 has been broadened adiabatically to form a waveguide that has a width that is greater than the width of the first part 4.

It is preferred also that the waveguide 1 be terminated inside the chip 2 before the waveguide reaches the facet 3.

FIG. 1 is only one embodiment of a design for a termination of a waveguide according to the invention in an optical waveguide component. The waveguide may continue below the surface EO in FIG. 1 and it may contain an optical component, such as an amplifier, a laser or a modulator. The component may be manufactured in several suitable waveguiding materials. It is preferable that the component is located in an InP crystal that ends at the facet 3.

The facet 3 has been treated with anti-reflection coating according to one preferred embodiment.

The reference letters P, Q and R specify three different schematic ray paths for the same sectioning angle Vk. The three rays illustrate how different parts of the light beam are spread by diffraction and then continue through the structure. The rays propagate from the first part 4 of the waveguide through the adiabatic broadening, through a more rapid non-diabatic broadening of the waveguide at GHKLM, through the second part 5, which is obliquely cut, of the waveguide to the facet 3.

At the beginning of the rapid increase, at GM, the rays start to diverge as a result of diffraction.

The rays are refracted at the oblique cut JK such that the rays acquire different angles due to the sectioning angle Vk. This contributes to most of the light reaching the facet 3 in a manner that is not orthogonal, which leads to a very small fraction of any reflected light that arises reaching back to the waveguide 1.

The sectioning angle Vk in the example in FIG. 1 is 60 degrees. Further, the first angle V1 is 87 degrees in the example.

The central ray Q, which follows the first part 4 of the waveguide up to JK, is refracted at the surface JK by approximately 2.6 degrees, as specified by FIG. 2, given that the sectioning angle is 60 degrees, whereby it follows that also the angle of incidence for this central ray onto the surface JK is 60 degrees. The second angle V2 is 87 degrees, so the light reaches the facet 3 at an angle of 84.4 degrees (87−2.6).

The ray P deviates by diffraction by 5 degrees to the left in the section GM. The angle of incidence onto the surface JK will then be 65 degrees. FIG. 2 shows that the light is then refracted by 3.3 degrees such that the light reaches the facet 3 at an angle of 78.7 degrees (87−5−3.3).

The ray R deviates instead by diffraction by 5 degrees to the right in the section GM. The angle of incidence onto the surface JK will then be 55 degrees. FIG. 2 shows that the light is then refracted by 2.1 degrees such that the light reaches the facet 3 at an angle of 89.9 degrees (87+5−2.1).

Since most of the light is diffracted through angles that lie far under 5 degrees, only a small fraction of the light reaches the facet 3 in an orthogonal manner and thus risks being reflected back into the waveguide 1.

Thus the problem with reflection back into the waveguide described in the introduction is solved by the present invention.

A number of embodiments have been described above. It is, however, obvious that the detailed design of the waveguide can be varied without the technical effect that the present invention provides being lost.

Thus can one or several of the surfaces of the waveguide be curved. The surface IH, for example, may have a convex rounding in order to reduce the risk that light reaches this surface, something that may have the ability to distort the bundle of rays. The surface JK may, in the same manner, have a convex rounding. This leads to the bundle of rays being more highly collimated after their passage through the surface JK.

Thus, the present invention is not to be considered to be limited by the embodiments described above since it can be varied within the scope specified by the attached patent claims.

The invention claimed is:

1. A waveguide for the extraction of light at low levels of reflection arranged to guide light from an electro-optical component on a chip to a facet of the chip for extraction, comprising:
   an extended first part having a first width;
   a second part having a second width, the second part comprising a surface through which the light exits from the waveguide, the second part comprising a section along which the waveguide is broadened adiabatically to have the second width greater than the first width; and
   a non-adiabatic longitudinal section located after the first part but before said surface of the second part in a direction of propagation of the light, the non-adiabatic longitudinal section being a widest part of the waveguide and having a taper to said first part, and said surface of the second part forms in a plane of the chip a first angle with an optical axis of the first part that lies between 5 and 80 degrees, wherein
   the waveguide terminates within the chip before the waveguide reaches the facet,
   the facet is designed to transmit the light,
   said first part forms in the plane of the chip a second angle that is not a right angle with said facet, said second angle being directed in a direction that adds to the first angle so that the light that exits said surface makes an angle to the facet which is further from perpendicular to said facet, and said second angle is less than 89 degrees but greater than 85 degrees, and an angle of incidence on the surface of 60 degrees is required to obtain a refraction of over 1.5 degrees.

2. The waveguide according to claim 1, wherein said surface of the second part forms the angle with the optical axis of the first part that is less than 70 degrees but greater than 20 degrees.

3. The waveguide according to claim 1, wherein said second angle lies within the interval from 86 degrees to 88 degrees.

4. The waveguide according to claim 1, wherein said first angle lies within the interval from 45 degrees to 60 degrees.

5. The waveguide according to claim 1, wherein the facet has been treated with an anti-reflection coating.

6. The waveguide according to claim 1, wherein the electro-optical component is located in an InP crystal that ends at the facet.

7. The waveguide according to claim 1, wherein at least one surface of the waveguide is curved or has convex rounding.

8. The waveguide according to claim 1, wherein the taper is a dual taper having a non-adiabatic first taper with an angle that is greater than an angle of an adiabatic broadening second taper.

9. The waveguide according to claim 1, wherein an angle of incidence on the surface of 70 degrees is required to obtain a refraction of 4 degrees.

10. A waveguide, comprising:
an extended first part having a first width;
a second part having a second width, the second part comprising a surface through which the light exits from the waveguide, the second part comprising a section along which the waveguide is broadened adiabatically to have the second width greater than the first width; and
a non-adiabatic longitudinal section located after the first part but before said surface of the second part in a direction of propagation of the light, the non-adiabatic longitudinal section being a widest part of the waveguide and having a taper to said first part, and said surface of the second part forms in a plane of a chip a first angle with an optical axis of the first part that lies between 5 and 80 degrees, wherein
the waveguide terminates within the chip before the waveguide reaches a facet of the chip,
the facet is designed to transmit the light, and
said first part forms in the plane of the chip a second angle that is not a right angle with said facet, said second angle being directed in a direction that adds to the first angle so that the light that exits said surface makes an angle to the facet which is further from perpendicular to said facet, and
an angle of incidence on the surface of 60 degrees is required to obtain a refraction of over 1.5 degrees.

11. The waveguide according to claim 10, wherein said surface forms the angle with the optical axis of the first part that is less than 70 degrees but greater than 20 degrees.

12. The waveguide according to claim 10, wherein said second angle is less than 89 degrees but greater than 85 degrees.

13. The waveguide according to claim 10, wherein said second angle lies within the interval from 86 degrees to 88 degrees.

14. The waveguide according to claim 10, wherein said first angle lies within the interval from 45 degrees to 60 degrees.

15. The waveguide according to claim 10, wherein the facet has been treated with an anti-reflection coating.

16. The waveguide according to claim 10, wherein the electro-optical component is located in an InP crystal that ends at the facet.

17. The waveguide according to claim 10, wherein at least one surface of the waveguide is curved or has convex rounding.

18. The waveguide according to claim 10, wherein the taper is a dual taper having a non-adiabatic first taper with an angle that is greater than an angle of an adiabatic broadening second taper.

19. The waveguide according to claim 10, wherein an angle of incidence on the surface of 70 degrees is required to obtain a refraction of 4 degrees.

20. A waveguide for the extraction of light at low levels of reflection arranged to guide light from an electro-optical component on a chip to a facet of the chip for extraction, comprising:
an extended first part having a first width;
a second part having a second width, the second part comprising an oblique first surface (JK) with convex rounding through which the light exits from the waveguide, and a second surface (GMNF) such that the second part comprises a section along which the waveguide is broadened adiabatically to have the second width greater than the first width; and
a non-adiabatic longitudinal section (GHLM) located after the first part but before said surface of the second part in a direction of propagation of the light, the non-adiabatic longitudinal section being a widest part of the waveguide and having a taper to said first part, and said surface of the second part forms in a plane of the chip a first angle with an optical axis of the first part that lies between 5 and 80 degrees, wherein
the waveguide terminates within the chip before the waveguide reaches the facet,
the facet is designed to transmit the light,
the facet has an antireflection coating,
said first part forms in the plane of the chip a second angle that is not a right angle with said facet, said second angle being directed in a direction that adds to the first angle so that the light that exits said surface makes an angle to the facet which is further from perpendicular to said facet, and said second angle is less than 89 degrees but greater than 85 degrees,
rays refracted from the oblique first surface (JK) acquire different angles so to reach the facet in a manner that is not orthogonal, and
an angle of incidence on the oblique first surface (JK) of 60 degrees is required to obtain a refraction of over 1.5 degrees.

21. The waveguide according to claim 20, wherein an angle of incidence on the first oblique surface of 70 degrees is required to obtain a refraction of 4 degrees.

22. A waveguide for the extraction of light at low levels of reflection arranged to guide light from an electro-optical component on a chip to a facet of the chip for extraction, comprising:
an extended first part having a first width;
a second part having a second width, the second part comprising a surface through which the light exits from the waveguide, the second part comprising a section along which the waveguide is broadened adiabatically to have the second width greater than the first width; and
a non-adiabatic longitudinal section located after the first part but before said surface of the second part in a direction of propagation of the light, the non-adiabatic longitudinal section being a widest part of the waveguide and having a taper to said first part, and said surface of the second part forms in a plane of the chip a first angle with an optical axis of the first part that lies between 5 and 80 degrees, wherein the waveguide terminates within the chip before the waveguide reaches the facet, the facet is designed to transmit the light, said first part forms in the plane of the chip a second angle that is not a right angle with said facet, said second angle being directed in a direction that adds to the first angle so that the light that exits said surface makes an angle to the facet which is further from perpendicular to said facet, and said second angle is less than 89 degrees but greater than 85 degrees, and an angle of incidence on the surface of 60 degrees is required to obtain a refraction of over 2 degrees.

* * * * *